US010909532B2

(12) United States Patent
Murray

(10) Patent No.: US 10,909,532 B2
(45) Date of Patent: *Feb. 2, 2021

(54) POS SYSTEM WITH WHITE BOX ENCRYPTION KEY SHARING

(71) Applicant: Clover Network, Inc., Sunnyvale, CA (US)

(72) Inventor: Brian Jeremiah Murray, Mountain View, CA (US)

(73) Assignee: Clover Network, Inc., Sunnyvale, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 16/169,351

(22) Filed: Oct. 24, 2018

(65) Prior Publication Data

US 2019/0188703 A1 Jun. 20, 2019

Related U.S. Application Data

(63) Continuation of application No. 15/843,264, filed on Dec. 15, 2017, now Pat. No. 10,140,612.

(51) Int. Cl.
*G06Q 20/38* (2012.01)
*H04L 9/14* (2006.01)
(Continued)

(52) U.S. Cl.
CPC ......... *G06Q 20/3829* (2013.01); *G06Q 20/20* (2013.01); *G06Q 20/207* (2013.01);
(Continued)

(58) Field of Classification Search
CPC .. G06Q 20/3829; G06Q 20/20; G06Q 20/207; G06Q 20/389; G06Q 2220/00;
(Continued)

(56) References Cited

U.S. PATENT DOCUMENTS 7,971,788 B2 * 7/2011 Quesselaire .......... G07F 7/0886
235/451
2008/0017712 A1 * 1/2008 Hart ....................... G06K 7/084
235/449
(Continued)

FOREIGN PATENT DOCUMENTS

EP 3226164 10/2017
EP 3226164 A1 * 10/2017 ............. H04L 9/002

OTHER PUBLICATIONS

European Search Report dated Apr. 16, 2019 from European Application No. 18212437.0, 10 pages.
(Continued)

*Primary Examiner* — James D Nigh
(74) *Attorney, Agent, or Firm* — Daylight Law, P.C.

(57) ABSTRACT

Systems, and associated methods, involving both a trusted and an untrusted device where sensitive data or keys are shared between those devices are disclosed. A disclosed method includes storing a key in a secure memory on a first device, receiving sensitive data via a user interface on a second device, generating a set of white box encryption instructions based on the key using a white box encryption generator on the first device, generating a complete data representation of the set of white box encryption instructions using a secure processor on the first device, transmitting the complete data representation from the first device to the second device, and encrypting the sensitive data using the complete data representation on the second device. The complete data representation is not Turing complete and is not executable with respect to the second device.

23 Claims, 8 Drawing Sheets

(51) Int. Cl.
*H04L 9/30* (2006.01)
*H04L 9/32* (2006.01)
*H04W 76/10* (2018.01)
*G06Q 20/20* (2012.01)
*H04L 9/08* (2006.01)
*H04L 9/00* (2006.01)

(52) U.S. Cl.
CPC .......... *G06Q 20/389* (2013.01); *H04L 9/002* (2013.01); *H04L 9/0866* (2013.01); *H04L 9/14* (2013.01); *H04L 9/30* (2013.01); *H04L 9/3247* (2013.01); *H04L 9/3263* (2013.01); *H04W 76/10* (2018.02); *G06Q 2220/00* (2013.01); *H04L 2209/08* (2013.01); *H04L 2209/16* (2013.01); *H04L 2209/56* (2013.01)

(58) Field of Classification Search
CPC ...... H04W 76/10; H04L 9/002; H04L 9/0866; H04L 9/14; H04L 9/30; H04L 9/3247; H04L 9/3263; H04L 2209/08; H04L 2209/16; H04L 2209/56
USPC .......................................................... 705/64
See application file for complete search history.

(56) References Cited

U.S. PATENT DOCUMENTS

| | | |
|---|---|---|
| 2010/0189263 A1 | 7/2010 | Cunningham et al. |
| 2010/0296649 A1 | 11/2010 | Katzenbeisser et al. |
| 2012/0042170 A1* | 2/2012 | Curtin ................... H04L 9/0841 713/185 |
| 2014/0324708 A1* | 10/2014 | McCauley ............ G07F 7/1075 705/72 |
| 2014/0380311 A1 | 12/2014 | Deng |
| 2015/0215117 A1 | 7/2015 | Kim |
| 2015/0270951 A1 | 9/2015 | Michiels |
| 2016/0261405 A1 | 9/2016 | Chevallier-mames |
| 2017/0180119 A1 | 6/2017 | Michiels et al. |
| 2017/0195117 A1 | 7/2017 | Wu |
| 2017/0294148 A1* | 10/2017 | Isobe ..................... H04L 9/002 |
| 2017/0346629 A1 | 11/2017 | Moon et al. |
| 2018/0137272 A1* | 5/2018 | Kamal ..................... G06F 8/71 |
| 2018/0219680 A1* | 8/2018 | Kamal ................. H04L 9/3231 |
| 2019/0272162 A1* | 9/2019 | Couillard ............... G06F 21/57 |

OTHER PUBLICATIONS

First Examination Report dated Feb. 17, 2020 from European Application No. 18212437.0, 11 pages.
A. Souchet, Spotlight on an Unprotected AES 128 White-Box Implementation, GitHub Blog, Diary of a Reverse-Engineer, (Available at: https://doar-e.github.io/blog/2015/02/08/spotlight-on-an-unprotected-aes128-whiteboximplementation/) (Posted: Feb. 8, 2015) (Accessed on: Apr. 24, 2018).
Billet et al., "Cryptanalysis of a White Box AES Implementation", Springer-Verlag Berlin Heidelberg, 2005, pp. 227-240 (Year: 2005).
Chow et al. (A White-Box DES Implementation for DRM Applications, Springer-Verlag Berlin Heidelberg, 2003, pp. 1-15). (Year: 2003).
Chow et al. ("White-Box Cryptography and an AES Implementation", Springer-Verlag Berlin Heidelberg, 2003, pp. 261-281) (Year: 2003).
Gan et al. ("Using Virtual Machine Protections to Enhance Whitebox Cryptography", 2015IEEE/ACM 1st International Workshop on Software Protection, 2015, pp. 17-23) (Year: 2015).
Michiels et al., "Mechanism for Software Tamper Resistance: An Application of White-Box Cryptography", DRM'07, Oct. 29, 2007, pp. 82-89 (Year: 2007).
Notice of Allowance dated Jul. 11, 2018 for U.S. Appl. No. 15/843,264.
Office Action dated Mar. 7, 2018 for U.S. Appl. No. 15/843,264.
Su et al., "A White-Box CLEFIA implementation for mobile devices", Sep. 2014, 8 pages, (Year: 2014).
Wyseur, White-Box Cryptography: Hiding Keys in Software, Feb. 2012, 8 pages (Year: 2012).
Xiao et al., "A Secure Implementation of White-Box AES", IEEE, 2009, 6 pages (Year: 2009).
Yoo et al., "A Method for Secure and Efficient Block Cipher using White-Box Cryptography", ICUIMC'12, Feb. 20-22, 2012, 8 pages (Year: 2012).
Summons to Attend Oral Proceedings dated Oct. 7, 2020 from European Patent Application No. 18212437.0, 14 pages.
Examination Report dated Dec. 3, 2020 from Australian Patent Application No. 2019271965, 5 pages.

\* cited by examiner

POS SYSTEM WITH WHITE BOX ENCRYPTION KEY SHARING

CROSS REFERENCE TO RELATED APPLICATIONS

This application is a continuation of U.S. patent application Ser. No. 15/843,264, filed on Dec. 15, 2017, which is incorporated by reference in its entirety herein for all purposes.

BACKGROUND

In certain technical environments, a trusted device and an untrusted device are required to securely share information. As used herein, trust is defined with respect to the perspective of an observer, such as the manufacturer of a device, and relates to a level of confidence held by that observer as to how secure a system is. Generally, a manufacturer will be able to assure that the devices they produce are trusted, but cannot have the same level of confidence in devices produced by unrelated third parties. Therefore, the manufacturer must consider the possibility that data stored in the memory of an untrusted device can be monitored and extracted without the permission of the operator of that untrusted device.

A specific example of one of the technical environments mentioned above is illustrated in FIG. 1. A secure card reader 100 can be paired with a smartphone 101, or other device, for purposes of processing a payment. Secure card readers that are configured for use with standard smartphones and tablets are appealing from a user convenience perspective because of the flexibility they provide and the division of labor between a low-cost task-specific device and a more complex user interface device that is already widely available. Standard secure card readers that are available today will obtain sensitive data from a payment card 102 and encrypted it internally. The secure card reader can then transmit the encrypted data to a payment processor 103. In this situation, the untrusted device (i.e., smartphone 101) is never in contact with unencrypted sensitive data, and instead merely provides a means for interfacing with the user. The term user input device is used herein to refer to the smartphone, tablet, or other discrete device that is operating in tandem with the secure card reader to communicate with a user and process a payment.

In certain payment flows, sensitive data is provided from a user via both the card reader and the separate user input device. For example, as shown in the bottom half of FIG. 1, secure card reader 100 could be used to obtain a personal account number (PAN) from a magnetic stripe or chip on a debit card, while smartphone 101 is used to obtain a personal identification number (PIN) from the card holder using a touch screen. In this situation, both secure card reader 100 and smartphone 101 will need to encrypt the data they receive to maintain the required level of security associated with processing payments.

Secure card readers are widely available, but the ability to receive a "PIN on glass" via the touch screen of any given smartphone is a functionality that is not widely available due to industry difficulties with extending standards-based security to an arbitrary smartphone. Therefore, because of the difficulty of sharing secure data and encryption keys with an unsecure or untrusted device, payment flows involving the entry of a pin on a smartphone are generally not supported by the convenient combination of a secure card reader and smartphone.

Secure communication between devices is often achieved through an exchange of keys such as those used for symmetric or asymmetric encryption. In the system of FIG. 1, one solution that could mitigate security concerns would be to encrypt the PIN on smartphone 101 using a key 105 previously provided from the secure card reader 100 over line 104. However, the untrusted nature of smartphone 101 complicates this approach. As mentioned previously, a key shared with an untrusted device could essentially be exposed when it is stored or used by an untrusted device. In an extreme case, an attacker could have the ability to monitor the execution of code on the untrusted device and extract the key. This extraction could be achieved by directly stealing the key data, monitoring the intermittent values generated in memory during an encryption process and extrapolating the key data, or monitoring the input-output of the encryption process over many samples to extrapolate the key data.

SUMMARY

Certain approaches disclosed herein relate to systems involving both a trusted and an untrusted device where sensitive data or keys are shared between those devices. The trusted and untrusted devices can be discrete devices. In the payments space, a secure trusted device could be a secure card reader and the untrusted device could be a user input device such as a smartphone or tablet with a touch screen or a dedicate keypad. In specific approaches, sensitive data is received on the untrusted device, and the data is secured on the untrusted device, but the untrusted device is not allowed to access any encryption keys held by the trusted device or any affiliated trusted element of the system.

Instead of delivering a key to an untrusted device, a secure device could instead locally conduct a procedure on a key to generate instructions that allow the untrusted device to perform either an encryption or a decryption in accordance with the key, without being able to reconstruct the key from those instructions. The instructions could then be delivered to the untrusted device and executed thereon to effectively allow the untrusted device to encrypt data in accordance with the key's encryption protocol without ever actually having access to the key itself or exposing the key values in the memory of the untrusted device. The instructions could be in the form of executable code. The instructions generated by the secure device can use certain techniques to thwart any attempt to extract the key via an analysis of the instructions.

The process of generating the instructions described above, and using it for purposes of either encryption or decryption on an untrusted device, is referred to as white box cryptography. The term "white box" is meant to refer to the fact that a system designer has no guarantee that an attacker will not be able to "look inside" the untrusted device while it is encrypting data and thereby extract the key used for that encryption. A module capable of generating either the encryption or decryption instructions from a cryptographic key can be referred to as a white box code generator. As used herein, the term "module" refers to both instructions stored on a non-transitory computer readable memory that are executable by a processor for purposes of instantiating a software object, and the software object itself.

FIG. 2 includes a basic block diagram 200 and flow chart 210 to illustrate approaches in which white box code is generated on a trusted device for purposes of conducting an encryption of data on an untrusted device. In block diagram 200, a trusted device 201 includes a secure memory 202 and a secure processor 203, while an untrusted device 204 includes a standard processor 205 and a user interface 206. Secure memory 202 and secure processor 203 could be integrated on the same chip or could be separate elements, and could also both be located under a tamper mesh within trusted device 201. Standard processor 205 could be any standard microcontroller or microprocessor. User interface 206 could be any means for receiving data from a user including a camera, touch screen, key pad, microphone, or any other system for receiving data from a user. User interface 206 could provide input data to a temporary working memory on device 204 and encrypted using standard processor 205 according to the procedure of flow chart 210.

The steps of flow chart 210 include generating white box encryption code on a first device and using the code to encrypt sensitive data on another device. Certain benefits accrue to generating the white box encryption instructions locally on the secure device instead of providing them via a server. White box encryption instructions and their complete data representations can exceed 1 mebibyte in size. Since white box cryptography results in fairly large key sizes, generating the instructions on a server and then transmitting the keys to a local memory can be untenable from a network usage and individual transaction delay perspective.

Flow chart 210 includes a step 211 of storing, in a secure memory on a first device, such as secure device 201, a key. The key could be a strong cryptographic key used for either symmetric or asymmetric encryption in accordance with a key protocol. The secure memory could be tamper resistant such that the key would be erased upon the device losing power or detecting a tamper. The secure memory, or at least a portion of the secure memory dedicated to storing the key, could be volatile memory.

Flow chart 210 also includes a step 212 of generating, using a white box encryption generator on a first device, such as secure device 201, a set of white box encryption instructions based on the key. Step 212 can be configured to generate different white box encryption instructions for the same key based off a random input to the generation process. The random input could be a random configuration parameter of secure device 201. The white box encryption instructions could be provided in the form of a code using a source code that can be interpreted, compiled, and executed on a second device, such as device 204. Flow chart 210 also includes a step 213 of transmitting the white box encryption instructions from the first device to the second device. The instructions can be transmitted across a secure communication channel between the secure device and the untrusted device. The first device could be secure device 201 and the second device could be device 204.

Flow chart 210 also includes a step 214 in which sensitive data is received on a user interface of the second device. The second device could be device 204 and the user interface could be user interface 206. In the situation where user interface 206 is a touch screen, the data could be stored as touch coordinates representative of the set of data, or as the sensitive data itself, in a working memory of device 204. The sensitive data could then be, in accordance with step 215, encrypted using the white box encryption instructions on the second device using a standard processor on the second device. The second device could be device 204 and the standard processor could be processor 205. As a result, the sensitive data received from user interface 206 will not be exposed for any appreciable duration of time on device 204 before it is encrypted, and processor 205 will never be in possession of the cryptographic key as it remains securely stored on secure device 201. The sensitive data can also be received on a secure portion of device 204 and securely encrypted before being transferred out of the secure portion.

Using some of the approaches represented by FIG. 2, executable code is transmitted from a secure device to an untrusted device for execution on the untrusted device. However, pushing executable code to a device is often subject to restrictions, and is sometimes outright prohibited. In some cases, distributing code to the untrusted device may require the involvement of a third party. For example, pushing code to an Android or iOS smartphone generally requires the code to be filtered through an applications store. The third-party process is out of the control of the system administrator responsible for assuring communication between the secure device and untrusted device. As a result, there is no guarantee that communication between the two devices will not be held up for an unacceptable period while executable code, such as the white box encryption instructions transmitted in step 213, are sent to the untrusted device. In certain approaches, a different key may be required every time the untrusted device encrypts or decrypts a new set of sensitive data. As a result, the time spent by the third party to review the executable code destined for the untrusted device would be required for each communication between the devices and result in an unacceptably long delay. Furthermore, in some approaches, a different key is required based on which user is operating the secure device. This would require each person downloading the application to their smartphone to be provided with a specific version of the application which would likewise be untenable and difficult to administrate. Furthermore, in some approaches, the general method used in step 212 can be updated independently of the application on the phone. The updates reduce the burden associated with updating the white box techniques to protect against a newly discovered attack.

To address restrictions on providing executable code to the untrusted device, the instructions that implement the functionality of the key can be translated into data in a specific format that is amenable to use by a specialized module on the untrusted device. As a result, there is no need to transfer executable code from the secure device to the untrusted device and there is no need to push code through a third-party system. Numerous variations of the process for generating the executable code, translating the code back into data, and utilizing the data for an encryption or decryption are disclosed herein. Regardless of the approach used, the data will be a complete description of the executable code, but at the same time is not Turing complete, and does not contain instructions that can be executed by the untrusted device. In short, the data will enable a specialized module on the untrusted device to execute the same white box encryption as the executable code, while not itself being usable for general purpose computing.

FIG. 3 includes a basic block diagram 300 and flow chart 310 to illustrate approaches in which a complete data representation of white box code is generated on a trusted device for purposes of conducting an encryption of data on an untrusted device. Flow chart 310 is distinguishable from flow chart 210 due to the addition of a step 311 in which a secure processor on the first device is used to generate a complete data representation of the set of white box encryption instructions generated in step 212. The secure processor could be secure processor 203 on secure device 201. The secure processor could instantiate a data representation generator for purposes of executing step 311.

The complete data representation can be transferred to the untrusted device and used to encrypt the sensitive data thereon. The complete data representation contains all the data necessary for a specialized module on the untrusted device to execute the white box encryption. The complete data representation can include a set of primitives from a library of primitives and a collection of data structures referenced by those primitives. The complete data representation can include a collection of lookup tables and a directed graph. The complete data representation will not be amenable to general purpose computing and can exist in memory exclusive of any executable instructions from the perspective of the untrusted device. Flow chart 310 also includes a step 312 of transmitting the complete data representation from the first device to a second device. The representation can be transmitted across a secure communication channel between the first device and the second device. Flow chart 310 also includes a step 315 of encrypting the sensitive data using a standard processor on the second device. The standard processor could be processor 205 on second device 204. Step 315 could involve a specialized module on the second device parsing the complete data representation to determine the steps necessary to encrypt the sensitive data in accordance with the key protocol. The specialized module could be a virtual machine instantiated using the standard processor. The complete data representation could thereby be parsed by the specialized module, while at the same time not being Turing complete with respect to the untrusted device and standard processor.

A disclosed method includes storing a key in a secure memory on a first device, receiving sensitive data via a user interface on a second device, generating a set of white box encryption instructions based on the key using a white box encryption generator on the first device, generating a complete data representation of the set of white box encryption instructions using a secure processor on the first device, transmitting the complete data representation from the first device to the second device, and encrypting the sensitive data using the complete data representation on the second device. The complete data representation is not executable.

A disclosed system includes a secure device with a secure processor and a secure memory, an unsecure device with a standard processor, a secure communication channel between the secure device and the unsecure device, a key stored in the secure memory, a white box encryption instruction generator: (i) instantiated by the secure processor; and (ii) programmed to generate a set of white box encryption instructions using the key, a data representation generator: (i) instantiated by the secure processor; and (ii) programmed to generate a complete data representation of the set of white box encryption instructions using the set of white box encryption instructions, and a virtual machine: (i) instantiated by the standard processor; and (ii) programmed to encrypt sensitive data using the complete data representation.

Another disclosed system includes an untrusted device with a user interface to receive sensitive data, a processor on the untrusted device, an operating system instantiated on the untrusted device by the processor, a secure card reader device, a wireless communication channel between the untrusted device and the secure card reader device, and a key stored in the secure card reader device. A memory on the secure card reader device stores instructions to: generate a set of white box encryption instructions using the key and generate a complete data representation of the white box encryption instructions. The system also includes an application instantiated on the untrusted device and programmed to encrypt the sensitive data using the complete data representation. The complete data representation does not include executable code for the operating system.

DETAILED DESCRIPTION

Systems and methods involving both a secure trusted and an untrusted device in which sensitive data or keys are shared between those devices are disclosed herein. The specific instance of the secure trusted device being a secure card reader and the untrusted device being a user interface device, such as a smartphone, is used for the sake of explanation. However, the concepts disclosed herein are more broadly applicable. A secure card reader can be manufactured by a payment device manufacturer to operate as a specialized trusted payments device. The secure card reader can include a secret key for encrypting payment information for delivery to a payments processor with whom the payment device manufacturer has an arrangement for payment processing. The secure card reader can also include a key used to generate white box encryption instructions for the untrusted device. An untrusted device can be an arbitrary smartphone, or other user interface device, with a specialized application installed for conducting some of the methods disclosed herein. The specialized application can be designed by the payment device manufacturer and distributed to smartphones by a third-party distribution system such as the Android or iOS application stores. Although this disclosure uses the specific environment of a secure card reader and smartphone as a vehicle for explanatory purposes, the approaches disclosed herein are more widely applicable to the communication or encryption of sensitive data in a system that includes untrusted devices generally, and they are not limited to payments technology.

Figure 1:
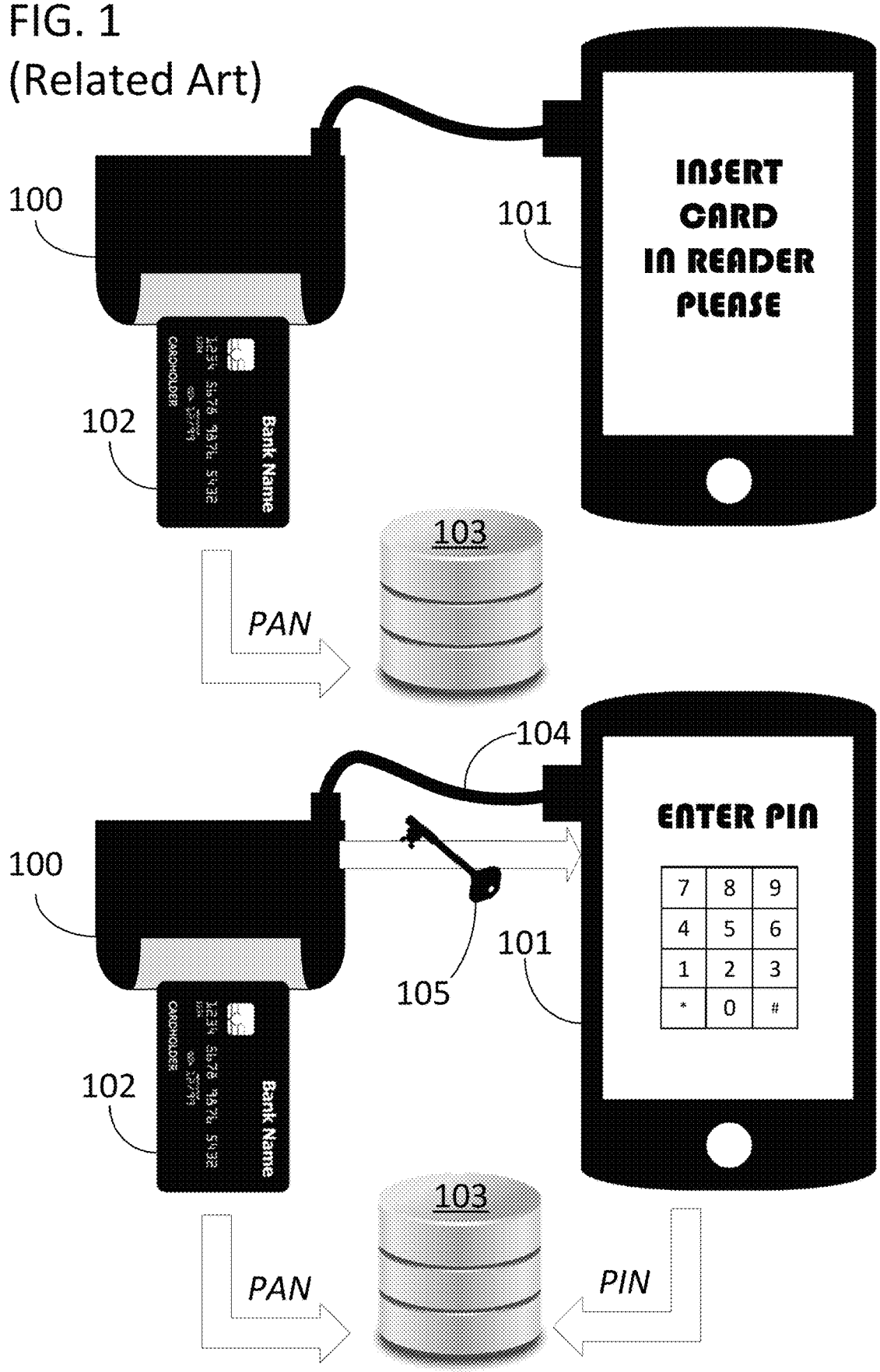
FIG. 1 illustrates two examples of how a secure card reader can be paired with a smartphone to process payments.
Figure 2:
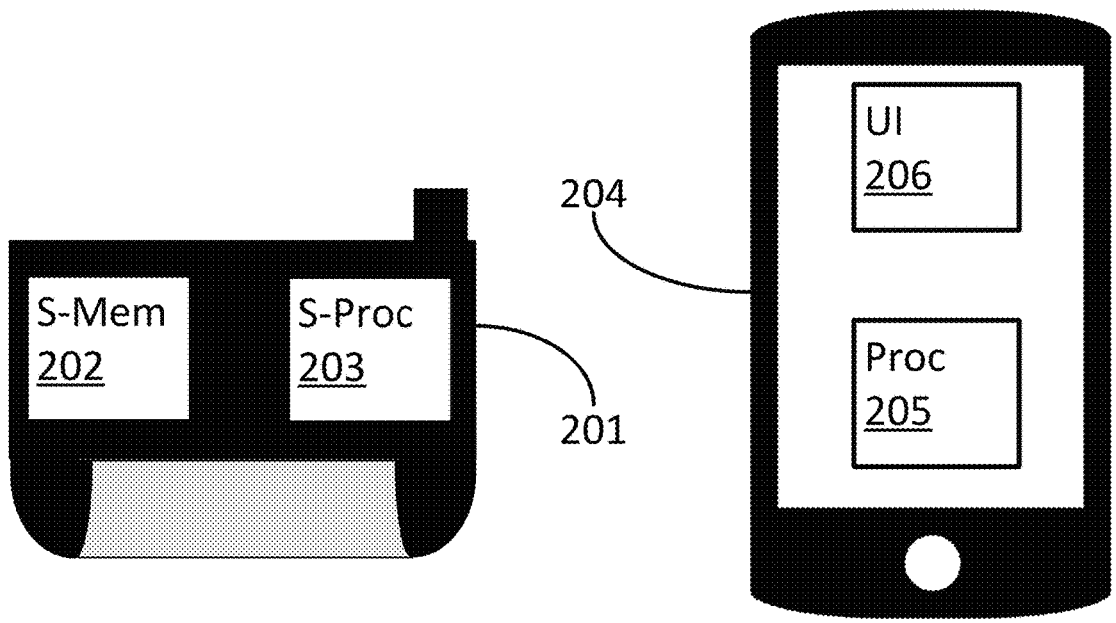
FIG. 2 illustrates a block diagram and flow chart to illustrate approaches in which white box code is generated on a trusted device for purposes of conducting an encryption of data on an untrusted device in accordance with approaches disclosed herein.
Figure 2:
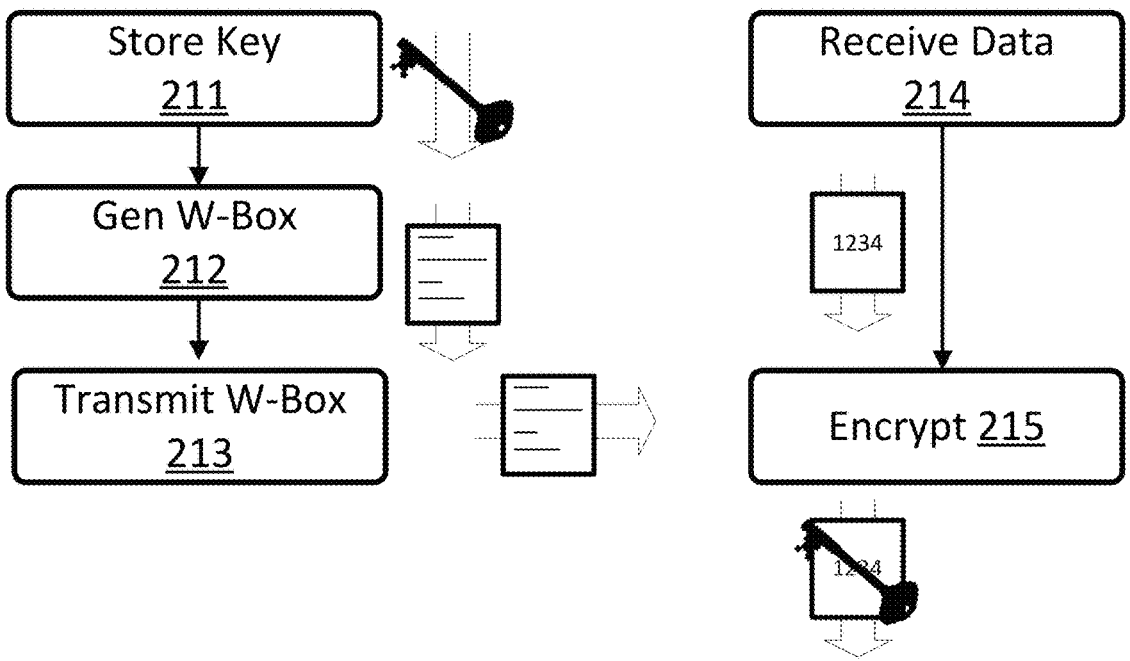
Figure 3:
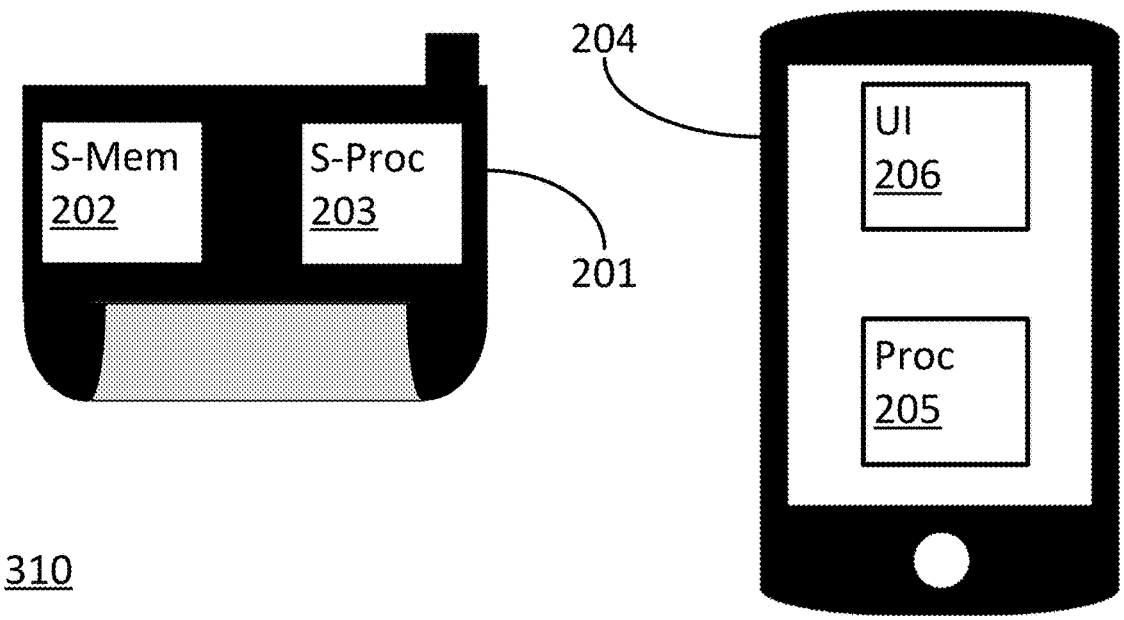
FIG. 3 illustrates a block diagram and flow chart to illustrate approaches in which a complete data representation of a white box code instruction set is generated on a trusted device for purposes of conducting an encryption of data on an untrusted device in accordance with approaches disclosed herein.
Figure 3:
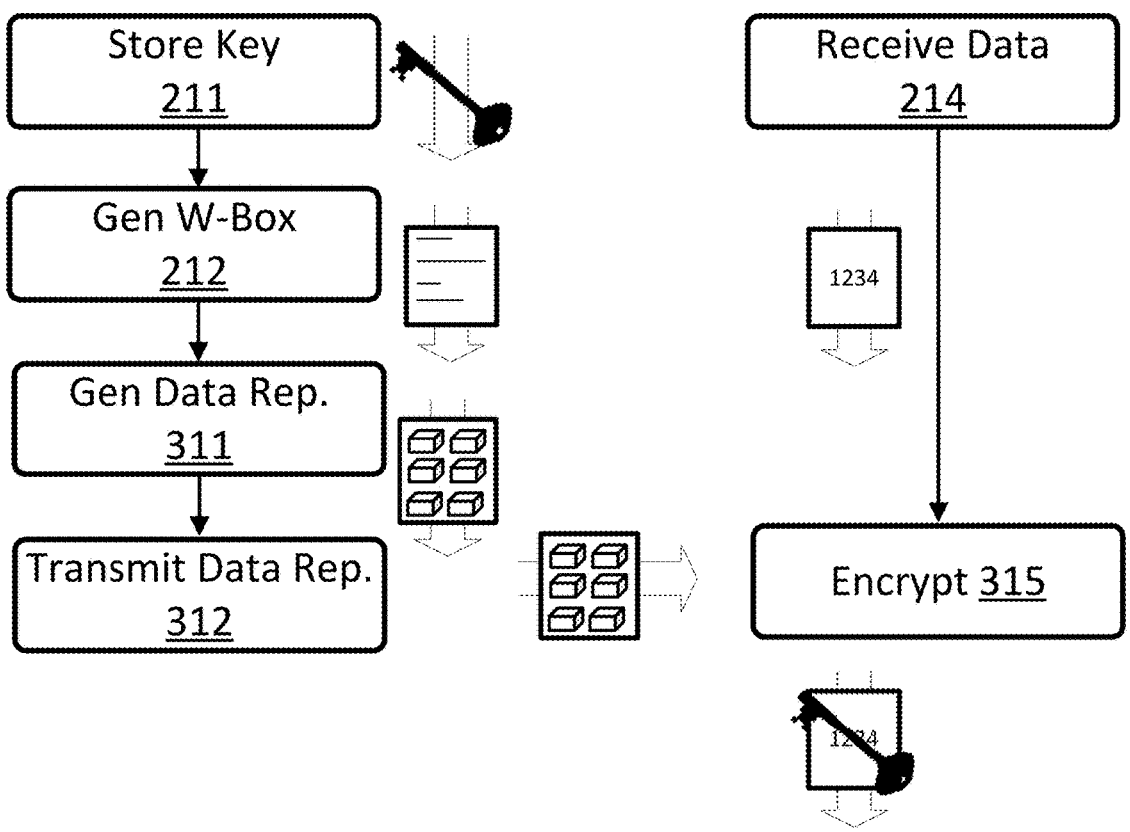
Figure 4:
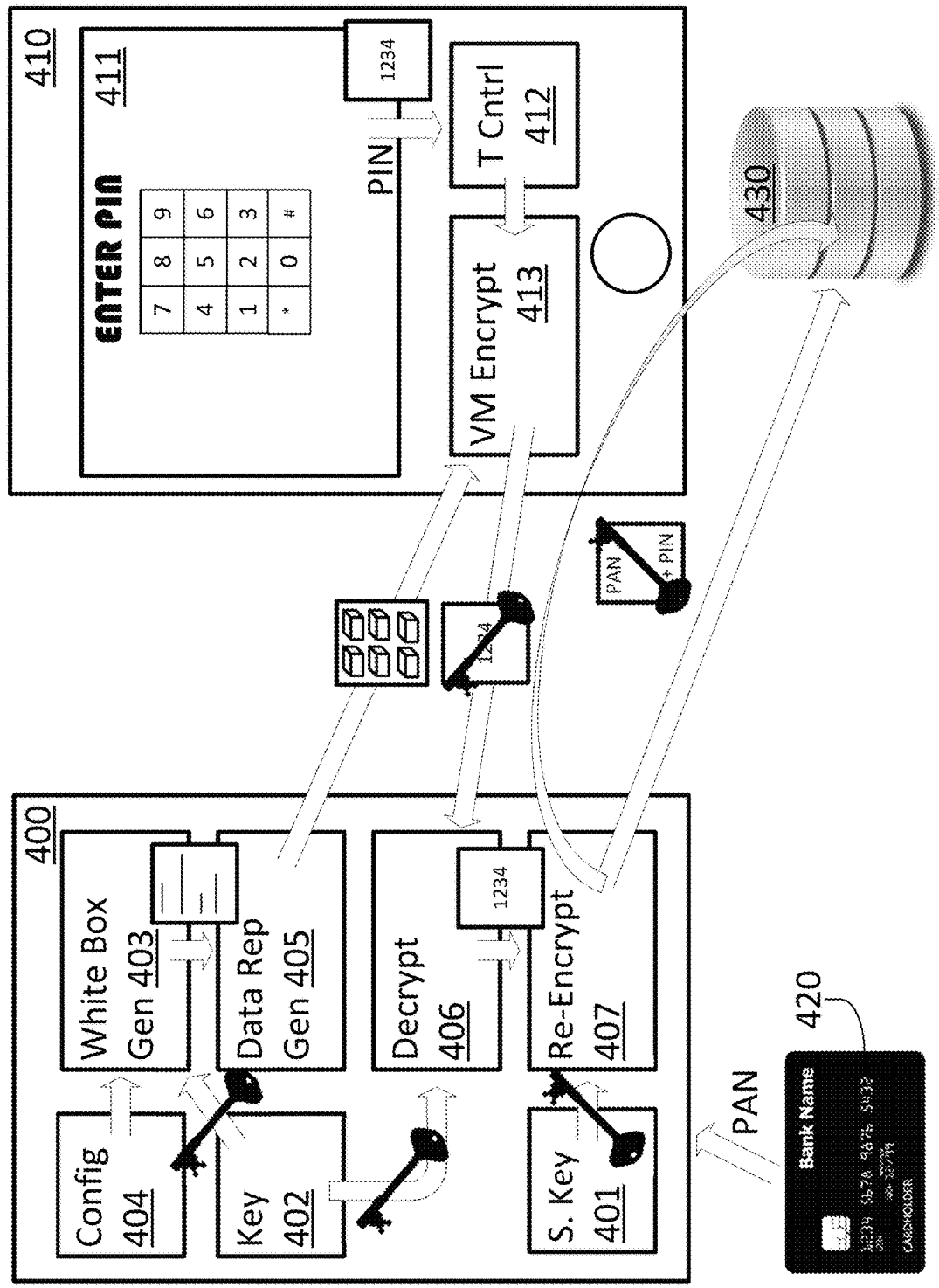
FIG. 4 illustrates a data flow diagram of a secure card reader communicating with a smartphone for purposes of securely obtaining and transmitting both a personal account number (PAN) and a personal identification number (PIN) associated with a payment card to a payment processor server in accordance with approaches disclosed herein.

FIG. 4 is a data flow diagram illustrating a secure card reader 400 communicating with a smartphone 410 for purposes of securely obtaining and transmitting both a personal account number (PAN) and a personal identification number (PIN) associated with a payment card 420 to a payment processor server 430. Transmission of both the PIN and PAN to payment processor server 430 can be conducted using a secret key 401 stored in a secure memory on secure card reader 400. The secret key can be referred to as a back-end key from a payment processing network. The secret key can be generated by a derived unique key per transaction (DUKPT) key set as provided by the payments processor that operates server 430. The PIN can be securely transferred from smartphone 410 to secure card reader 400, for further transmission on to payment processor server 430 using another key such as local encryption key 402.

Local encryption key 402 can be a symmetric or asymmetric encryption key. Local encryption key 402 can be a public key associated with a public key certificate that is stored in a secure memory on secure card reader 400 which is either injected into the secure card reader in a key injection room in a manufacturing facility or injected into the secure card reader using a remote key injection (RKI) procedure. Local encryption key 402 can be used as part of a white box encryption protocol to facilitate secure communication with smartphone 410 without delivering local encryption key 402 itself to smartphone 410. White box encryption conducted on smartphone 410 can use any number of encryption protocols or techniques. In particular, secure card reader 400 can generate, and smartphone 410 can use, white box instructions that implement the AES block cipher to encrypt the PIN in a format defined under the ISO 9564-1 ("PIN Block") format. The ISO 9564-1 format may be used to encrypt both the PIN and the PAN to generate the PIN block. However, in certain approaches, it is beneficial to not transfer the PAN from secure card reader 400 unless it is encrypted with secret key 401. As such, a random number generated on secure card reader 400 could be used in place of the PAN when generating the white box instructions. The random number would be stored by secure card reader 400 in association with, or as part of, local encryption key 402 so that it could be used to decrypt the PIN. The random number could be changed each time a set of white box instructions were generated by secure card reader 400.

Secure card reader 400 is manufactured by a payment device manufacturer and includes certain security features such as a secure storage and execution environment with a secure processor and memory, tamper sensors, and tamper meshes for keeping encryption keys and sensitive payment data secure and isolated form attackers. Secure card reader 400 is a trusted device from the perspective of both the manufacturer of secure card reader 400 and the operator of payment processor server 430 as secure card reader 400 will meet certain standards required by that operator. For example, secure card reader 400 may be a payment card industry (PCI) compliant reader.

Secure card reader 400 can include means for receiving payment data from payment card 420 such as a magnetic stripe reader, chip reader, or an antenna for contactless cards. Smartphone 410 can include some of the above-mentioned security features as well, but is not required to include such features. Smartphone 410 can include a general processor and a user interface, such as a touch screen 411, for receiving additional payment information from a user. In a specific approach, secure card reader 400 will obtain a PAN from payment card 420 and smartphone 410 will obtain a PIN from a holder of payment card 420 using touch screen 411 and a touch screen controller 412. The smartphone could include a secure mode to prevent touch data from being used to determine the PIN. Using the following approach, the PIN can then be encrypted by local encryption key 402, securely transferred to secure card reader 400 from smartphone 410, and then encrypted using secret key 401 for transmission to payment processor server 430.

Communication between secure card reader 400 and smartphone 410 can be conducted using a wired or wireless connection. In some approaches, smartphone 410 will provide power to secure card reader 400 using a wired connection, and communicate with secure card reader 400 using a wireless connection. In certain approaches, the wired connection will be provided via a micro-USB or similar interface. In certain approaches, the wired connection will be provided via a 3.5 or 2.5 mm jack that is otherwise used for stereo sound output or microphone input. The wireless connection can be conducted using any wireless protocol such as Bluetooth, Bluetooth Low Energy (BLE), Z-Wave, ZigBee, IrDA, or similar protocols. The data sent over the connection between secure card reader 400 and smartphone 410 can be encrypted and can be protected with cryptologic signatures.

FIG. 4 is illustrative of a class of systems in which a secure device includes encryption keys that cannot be used or stored outside of a trusted environment. The trusted environment could be one in which trust is measured from the perspective of the operator of payments processing server 430 and is set by an industry standard such as the PCI standards. Accordingly, both secret key 401 and local encryption key 402 cannot be stored, even temporarily, outside of the trusted environment. Secure communication between secure card reader 400 and smartphone 410 is therefore conducted without transferring local encryption key 402 to smartphone 410. Furthermore, communication over a larger network than that set by the two discrete devices shown in FIG. 4 requires use of the secret key 401, which is a stronger and more resource hungry encryption key than local encryption key 402, and is intended to be secure enough to transfer payment data over a large network such as the Internet. As shown in the diagram, secure card reader 400 can leverage the large area network communication capabilities of the smartphone 410 to communicate with payments processing server 430, or it can communicate directly with the server. The route taken by the encrypted payment information can depend on the capabilities of device 400, the battery available on device 400, or the relative strength of the network connection between the two devices. For example, device 400 could be designed to be low cost such that it only had local communication capabilities such as a modem for Bluetooth communications, while device 410 was a fully equipped smartphone with the ability to communicate via the Internet.

Although local encryption key 402 is never transferred from secure card reader 400 to smartphone 410, communications from the smartphone 410 to the secure card reader 400 can be conducted over a secure channel as secured by the encryption protocol of local encryption key 402 using white box encryption. As illustrated, secure card reader 400 can use local encryption key 402 as the input to white box encryption generator 403 to generate a set of executable instructions that can be used to implement the encryption protocol of local encryption key 402 without being capable of revealing the key itself. White box encryption generator 403 can be a module instantiated on secure card reader 400 using a secure processor and memory.

White box encryption generator 403 can obfuscate the generated instructions to prevent an attacker from reconstructing the key using the instructions. For example, the instructions could include a set of lookup tables and the values in the tables could be used along with algebraic reconstruction techniques, that use the key values as unknowns, to solve for the key values based on the table values. However, obfuscation techniques could be used to thwart algebraic reconstruction. The obfuscation could utilize random configuration data 404 generated or previously stored within the secure area of secure card reader 400 to assure that the obfuscation could not be reverse engineered even if the exact approach was known. Configuration data 404 could be stored in a manner such that it would not be discoverable from outside the device without triggering a tamper event and thereby result in the keys on the device being erased, and additionally registered as compromised.

White box encryption can be conducted on smartphone 410 using the executable code generated by white box encryption generator 403 directly. The executable code can be transmitted from secure card reader 400 to smartphone 410 and executed by a processor on smartphone 410 using the sensitive data. The process can be conducted in a secure portion of smartphone 410 and may be conducted while the device is in a secure mode. However, there may be restrictions or prohibitions on pushing executable code to smartphone 410. For example, code that needs to be pushed to smartphone 410 may need to be transferred through a third-party channel over which the manufacture of secure card reader 400 does not have control. In these approaches, the executable code could be translated into a data representation using a data representation generator, such as data representation generator 405, prior to being transferred to smartphone 410.

Data representation generator 405 may be a module instantiated using a secure processor and secure memory on secure card reader 400. Data representation generator 405 may take in the white box encryption instructions as an input and produce a complete data representation of the instructions. The complete data representation will not be Turing complete and will not be executable by the operating system or general processor on smartphone 410. However, the complete data representation may be parsed by a module on smartphone 410 and used by that module to encrypt the PIN received from touch controller 412. The complete data representation may include a set of primitives and data structures. The complete data representation may include a set of lookup tables, and a directed graph, as will be described below. The module on smartphone 410 that parses the complete data representation could be a virtual machine such as virtual machine 413. The virtual machine 413 may be a software computer instantiated by a processor and an operating system on smartphone 410. Virtual machine 413 can parse the complete data representation to find an order in which specific values are to be calculated, certain operations on those values that are to be conducted, and lookup tables in which to lookup values based on the input to the table. The use of a virtual machine provides certain benefits in that the white box encryption scheme, as orchestrated by the secure device, becomes platform independent, as the underlying operating system or kernel of the untrusted device no longer needs to be compatible with the encryption protocol.

The use of white box encryption instructions generated by white box encryption generator 403 represents a superior approach to an asymmetric public and private key pair communication. Using this approach allows the system to produce a different key for encrypting each input of sensitive data while at the same time not providing numerous public key samples to a potential attacker. Furthermore, certain industry standards such as those in compliance with ISO 9564 will only allow symmetric cryptography for encrypting PINs so asymmetric cryptography is not an available option. In addition, private key generation can be resource intensive. For example, RSA private keys require substantial computation to generate. An embedded secure processor with an RSA acceleration ASIC can take 1-3 minutes to generate a 2048-bit RSA private key. Using some of the approaches herein, a new white box key can be generated for each transaction which reduces the attackers gain from reverse engineering the code for a particular white boxed key.

The approaches represented by FIG. 4, allow the PIN to be encrypted for transmission to secure card reader 400 through a secure connection in a small area network, and then re-encrypted for transmission to payments processor server 430 through a large area network. Once the PIN is encrypted on smartphone 410 using a protocol in accordance with local encryption key 402, it can be transmitted back to secure card reader 400 over a secure connection. The protocol could be one of the methods specified in ISO 9564 part 1. The secure connection can be the same connection used to transmit the white box encryption instructions, or complete data representation thereof, from the secure card reader 400 to smartphone 410. The PIN can then be decrypted using a decryption module 406 using the local encryption key 402. As illustrated, the key could be a symmetric key with the white box encryption instructions used to execute the encryption of data by the symmetric key, while not being capable of executing the decryption, while the decryption module 406 utilizes the symmetric key to decrypt the PIN.

Once decrypted, the PIN from smartphone 410 can be re-encrypted by a re-encryption module 407 using secret key 401. The PAN can likewise be encrypted by secret key 401 using an encryption module, which is not shown in the diagram, though it can be the same module as the one used to re-encrypt the PIN. Subsequently, both the PAN and PIN as encrypted by secret key 401 can be transmitted to payments processor server 430. As illustrated, the data can either be sent directly to the server, or it can be transmitted first to smartphone 410, and then sent on to server 430.

Although the example of FIG. 4 was limited to a smartphone and a secure card reader, it should be appreciated that numerous other devices could be used in their place while still applying the underlying concepts for sharing sensitive data between the two devices without sharing a local encryption key. For example, secure card reader could be any trusted device that is used to obtain payment information from a user such as a biometric scanner, QR code scanner, or any other device capable of receiving information from a user using a sensor. Likewise, smartphone 410 could be any untrusted device capable of receiving sensitive data from a user. The device could be any user input device such as a tablet, dedicated keypad, touch display terminal, or any other device capable of receiving information from a user using a sensor.

FIGS. 5-8 provide examples of white box encryption generators and data representation generators that can be used in accordance with the approaches disclosed herein. The illustrated approach corresponds to a simplified version of AES as described in FIPS 197. However, as mentioned earlier, the disclosed concept can be used with any kind of symmetric cipher such as 128-bit, 192-bit and 256-bit AES, RSA, SQUARE, CRYPTON, ARIA, Camellia, Data Encryption Standard (DES), Triple Data Encryption Standard/Algorithm (TDES/TDEA), Blowfish, Serpent, Twofish, Threefish, Secure and Fast Encryption Routine (SAFER), International Data Encryption Algorithm (IDEA), Tiny Encryption Algorithm (TEA), extended TEA (XTEA), and others.

Encryption using AES involves the generation of a key schedule from a base key where the key schedule is a sequence of round keys $K_o, K_1, \ldots K_n$ which are used for each encryption round. The process involves three operations: RotWord, Subword, and Rcon. RotWord involves breaking the key into 32-bit words and rotating each word 8 bits to the left with the high bits wrapping around. Subword involves replacing each byte with a new byte based on a substitution box. Rcon involves computing $w^{i-1}$ for each word (w) and round (i) over the Galois field $F_{2^8}$. After the key schedule has been generated, the round keys are applied in a series of encryption rounds to the sensitive data. In 128-bit AES there are 10 rounds and 10 associated 16-byte round keys in the key schedule.

Figure 5:
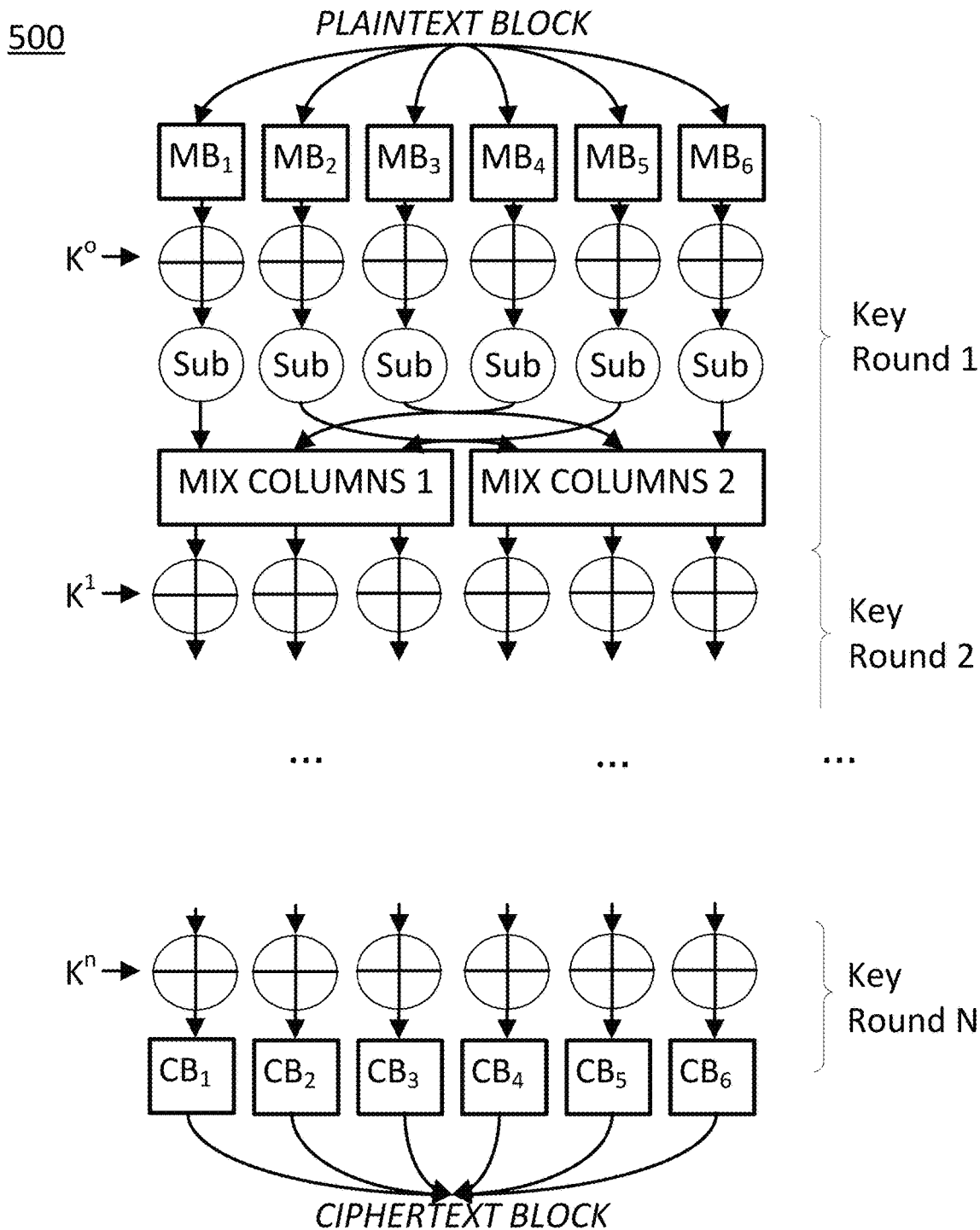
FIG. 5 illustrates a data flow diagram of a simplified version of the key rounds involved in a symmetric block cipher used to describe the approaches disclosed herein.

FIG. 5 is a data flow diagram 500 for a simplified version of the key rounds involved with an AES symmetric block cipher. Flow diagram 500 illustrates how sensitive data PLAINTEXT BLOCK is encrypted into a string of encrypted data CIPHERTEXT BLOCK. PLAINTEXT BLOCK can be a portion of a message that has been broken down into pieces of a size that are compatible with the cipher. The process involves breaking the sensitive data into a set of chunks such as $M_{B1}$-$M_{B6}$. The data is then subjected to a series of key rounds. The flow diagram illustrates a first key round, and a portion of both the second key round and final key rounds. The flow diagram assumes that the round keys $K_o, K_1, \ldots K_n$ have already been generated. Each round of AES has four steps: SubBytes, ShiftRows, MixColumns and AddRoundKey. The SubBytes step involves replacing each byte with a new byte based on a substitution box. The step is the same as SubWord in the key generation schedule. The step is illustrated using the reference "Sub" in FIG. 5. The ShiftRows step involves selected bytes being shifted between rows in the state matrix. The step is illustrated using the arrows after the substitution step. The MixColumns step involves each column in the state matrix being combined using an invertible linear transform. The linear transform is a multiplication in the Galois field. The step can be implemented via lookup tables instead of direct Galois arithmetic. The step is illustrated by the reference "Mix Columns" in FIG. 5. The AddRoundKey step involves conducting an exclusive-or operation on the state matrix using the round key for that round. The step is illustrated by the exclusive-or blocks and round key indicators in FIG. 5. In the simplified illustrated example of FIG. 5, the round key would need six independent elements. The output of these four steps would then be provided to the next key round. The output of the final key round would then be a set of chunks $C_{B1}$-$C_{B6}$ comprising the encrypted data CIPHERTEXT BLOCK.

Figure 6:
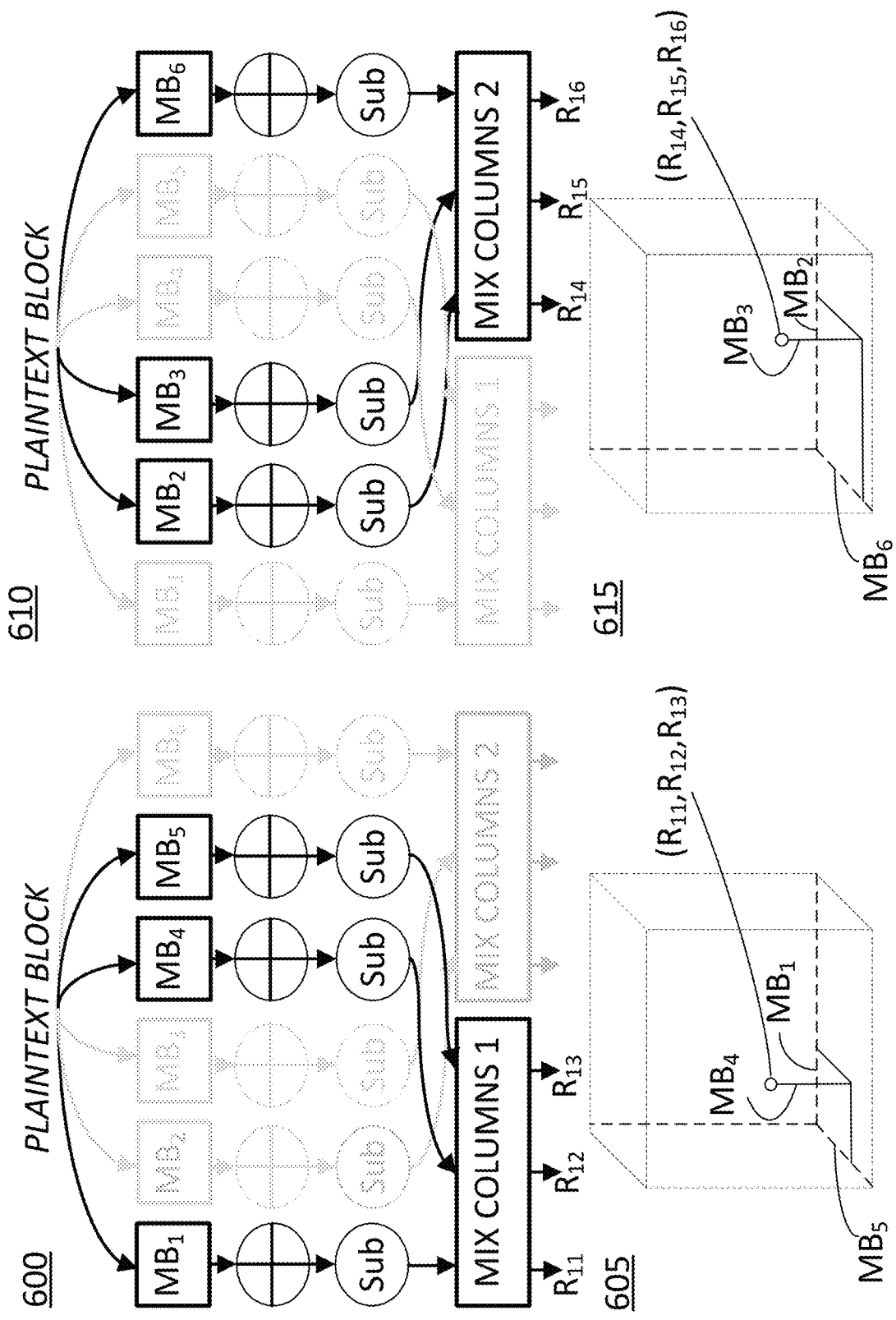
FIG. 6 illustrates two data flow diagrams for the decomposition of the symmetric block cipher in FIG. 5 into a set of lookup tables in accordance with approaches disclosed herein.

The combined operation of a white box instruction generator and complete data representation generator that can be utilized in combination with the approaches disclosed herein can be described with reference to FIG. 6. The data flow diagram of FIG. 5 can be decomposed into a set of complex lookup tables in which a given set of values for $C_{B1}$-$C_{B6}$ is produced for a given set of values for $M_{B1}$-$M_{B6}$. Data flow diagram 600 in FIG. 6 is an illustration of a portion of key round 1 from data flow diagram 500 in which only data chunks $M_{B1}$, $M_{B4}$, and $M_{B5}$, and the output of MIX COLUMNS 1 are relevant. Those outputs are a portion of the input to key round 2 and can be referred to as $R_{11}$, $R_{12}$, and $R_{13}$. Likewise, data flow diagram 610 in FIG. 6 is an illustration of a second portion of key round 1 from data flow diagram 500 in which only data chunks $M_{B2}$, $M_{B3}$, and $M_{B6}$, and the output of MIX COLUMNS 2 are relevant. Those outputs are a portion of the input to key round 2 and can be referred to as $R_{14}$, $R_{15}$, and $R_{16}$.

The relationship of the inputs and output of data flow diagrams 600 and 610 are independent and can each be represented by independent lookup tables illustrated by data structure 605 and 615 respectively. Data structures 605 and 615 are three-dimensional lookup tables in which the PLAINTEXT BLOCK data chunks are inputs and the outputs are the inputs to key round 2. For any potential input to data flow diagram 600, data structure 605 will include a corresponding output. The same is true for data flow diagram 610 and data structure 615. Notably, neither of these data structures require the inclusion of key $K^o$. As such, a white box instruction generator and a complete data representation generator can be used to generate a set of data structures that can be used to implement an encryption protocol using a given key without exposing the key to potential attackers that have access to the memory of a device conducting the encryption.

Figure 7:
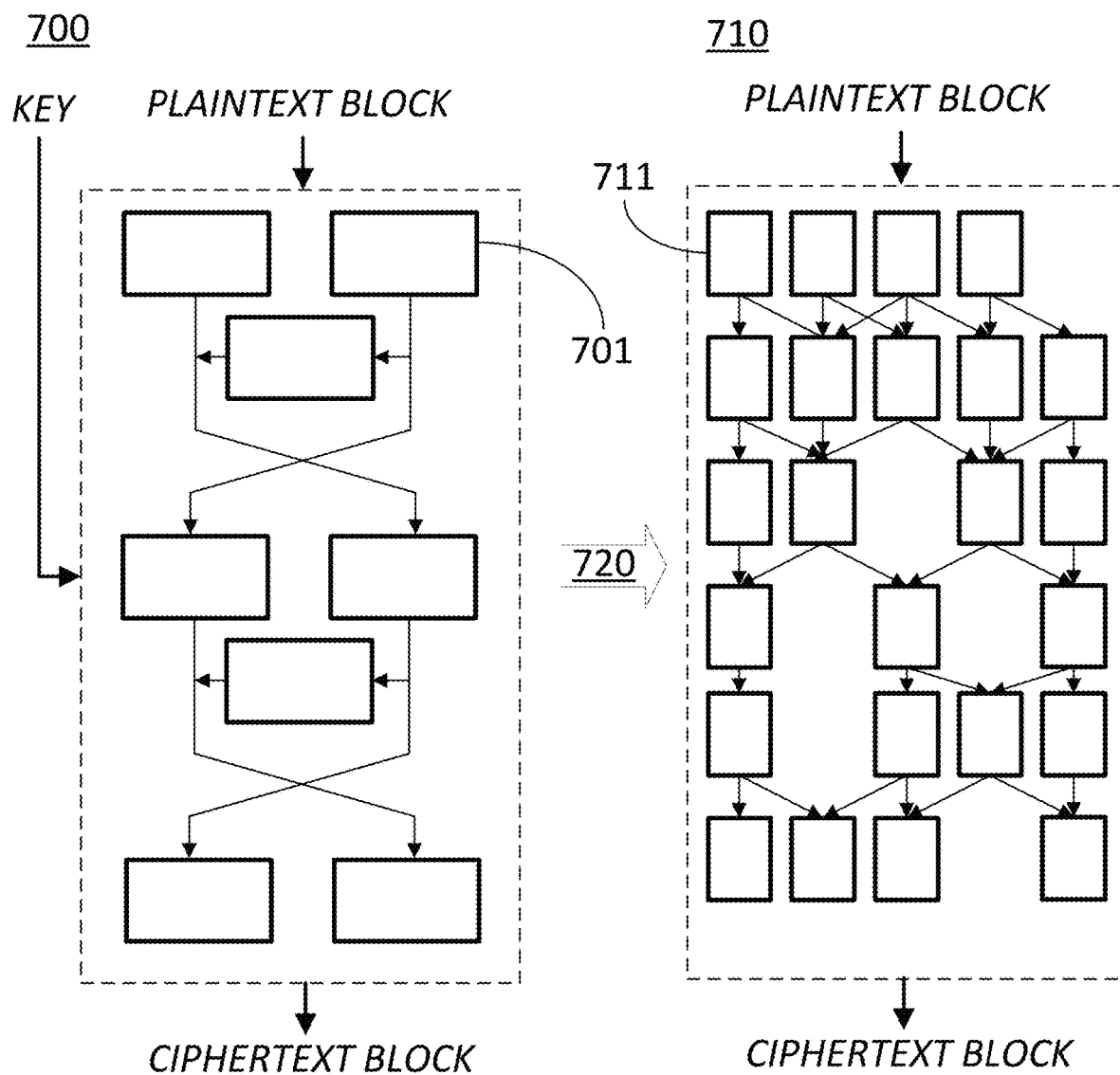
FIG. 7 illustrates two data flow diagrams to describe the translation of the key rounds involved in a symmetric block cipher into a set of lookup tables and a directed graph in accordance with the approaches disclosed herein.

FIG. 7 provides two data flow diagrams that can be executed by a processor in order to execute an encryption. Data flow diagram 700 receives the sensitive data to be encrypted PLAINTEXT BLOCK, receives an encryption key KEY, executes a set of functions 701, and produces an encrypted output CIPHERTEXT BLOCK. Referring back to FIG. 4, the action of white box encryption generator 403 can be illustrated by arrow 720. Data flow diagram 710 conducts the same encryption as data flow diagram 700 but does not require KEY as an input and instead utilizes lookup tables 711 configured in such a fashion that the input-output relationships of the lookup tables absorb the key and keep it hidden from an attacker that is able to monitor the intermittent values generated by a processor during the execution of data flow diagram 710. Therefore, instead of encoding the key directly, the code that implements the white box encryption can be a set of functions that depend on the value of the key. Furthermore, some sets of functions are composed into a single function.

A device could also have several modules that implement step 720 in different ways. A random input parameter to the white box instruction generator could be used to decide which implementation of method 720 should be used. The white box instruction generator could also execute step 720 using different white box methods for different portions of the encryption process, and the random input parameter could be used to select what method to use for what part of the encryption process. The random input parameter could be, or be derived from, a random configuration value from the device. Furthermore, different white box techniques could be applied to any set of transforms in the encryption process. Different white box techniques may apply to different transforms in the encryption process. In some implementations, some, but not all, transforms that are the outputs of one white box technique could be further obscured by applying additional white box techniques.

A data representation generator, such as data representation generator 405, can extend the process illustrated in FIG. 7, by translating data flow diagram 710 into a complete data representation that does not include any executable code. The complete data representation generator could generate a set of primitives from a library of primitives and a set of lookup tables. The complete data representation generator could generate lookup tables 711 and could also generate a directed graph to enable the specialized module to determine how the lookup tables should be utilized in order for the full set of key rounds to be executed. The data structures could be tagged with identification data corresponding to entries in the directed graph so that the module could determine that the output of one data structure was to be used as the input to the next. A specialized module on another device could then parse the complete data representation to execute data flow diagram 710 without any executable code being transferred to that device.

Returning to the example of FIG. 4, virtual machine 413 can parse a data representation generated by data representation generator 405 to execute a white box encryption protocol produced by white box encryption generator 403. In this example, white box encryption generator 403 will execute arrow 720 in FIG. 7, while specialized module 413 will execute the data flow diagram after parsing the complete data representation. These steps can all be accomplished without secure card reader 400 sending any executable code to smartphone 410. Using this approach, even if an attacker is able to monitor the values generated during the encryption process conducted by virtual machine 413, the key values will not appear in memory on smartphone 410.

Some approaches in which the white box encryption instructions are broken down into a complete data representation provide certain benefits in that the white box implementation conducted by the system can be updated frequently without requiring a new program to be installed on the second device. To assure security, the white box protocol utilized to secure communications may need to be updated on a frequent basis such as every month. However, if the white box encryption instructions are broken down into primitive components, multiple white box protocols can be executed by the same specialized module on the second device by generating different primitives and the software on the second device will not need to be updated. This is beneficial given the concerns with pushing code to the second device mentioned above, and general concerns regarding updating the software on multipart systems that must maintain compatibility. In particular, the method of obfuscating the instructions or data representation can be updated without requiring an update of the software on the untrusted device. Current white box obfuscation methods may be defeated by new mathematical techniques that are not yet known. The use of a complete data representation that is configured to represent any primitive operation that can be conducted by a white box encryption obfuscation scheme allows new obfuscation methods to be deployed without updating the software on the untrusted device.

The instructions and data structures described above can be subjected to additional processing to assure that the underlying key cannot be gleaned via an analysis of the instructions or data in isolation. Generating data structures such as 605 and 615 to be used in place of a set of functions that are directly reliant on the key values for an encryption process provide a level of security to the underlying keys. However, the key values are still indirectly represented by the data structures in that they control the relationship between the inputs and outputs, and hence they can potentially be extracted from an analysis of the data structures using algebraic relationships and analysis. To thwart these kinds of attacks, the white box encryption instructions can be obfuscated to prevent reverse engineering. In approaches in which either the white box instructions or the complete data representation utilize lookup tables, the obfuscation can be conducted via the introduction of mixing encodings into the lookup tables. For example, bijective mixing encodings can be applied. The encodings can be chosen such that they offset when compounded. Therefore, utilizing the lookup tables in the appropriate order will cause the encodings to drop out of the calculation while preventing the analysis of specific lookup tables to yield information that could lead to a discovery of the underlying encryption keys.

With reference to FIG. 7, the white box instruction generator could be designed to ensure that each transform in the underlying cipher 700 has had a minimum number of white box techniques applied to it before generating data flow diagram 710. Since the size of the tables of the output of a white box technique is generally greater than the size of the tables in the inputs, method 720 could also be designed to apply additional white box techniques (after all base cipher transforms been subject to at least a set number of white box techniques) to randomly selected transforms until the total size of the output exceeded a predefined value. Some white box techniques used in process 720 may not chain together well. For example, the techniques could increase the size of the output without providing additional security. Method 720 could be designed to avoid chaining techniques in such circumstances by preventing those techniques from being chained even if they were randomly selected.

In certain approaches, the complete data representation or white box encryption instructions can also be secured by being generated using random configuration data on the secure device. For example, random configuration data 404 can be applied to obfuscate and add additional security to either the generation of the white box encryption instructions or the complete data representation. The random configuration data can be: a hash of information such as a network ID, serial number, setting values, and other random configuration data on the secure device; or the out of a hardware random number generator (RNG) or software pseudo-RNG. The random configuration data can be used to obfuscate the white box encryption instructions or select how the white box encryption instructions are obfuscated or otherwise secured from extraction. This additional layer of security would serve to protect the keys from extraction even if the specific method of obfuscation was known to an attacker.

The complete data representation generated to implement flow diagram 710 after white box encryption generator has generated the according instructions can be conducted in numerous ways. In certain approaches, the data representation can be non-executable code generated in a custom programming language that is deliberately designed to not be Turing complete. To generate the complete data representation, the secure device can take an encryption key, expand the key schedule, and build a process graph of the encryption process. The process graph could then optionally be obfuscated through the introduction of mixing encodings such as bijective mixing encodings. The secure device can then decompose the process graph into a complete data representation. The complete data representation generator can be configured to produce primitives and data structures that can be parsed by a specialized module on the unsecure device to implement the process graph. The generator can be designed to utilize a library of primitives that are common to any white box encryption protocol such as a library consisting of a concatenate primitive, a table lookup primitive, and a bit selection primitive. The table lookup primitive could consist of the data table itself where the identity of the transform as a table lookup transform is understood by the specialized module when parsing the complete data representation.

Figure 8:
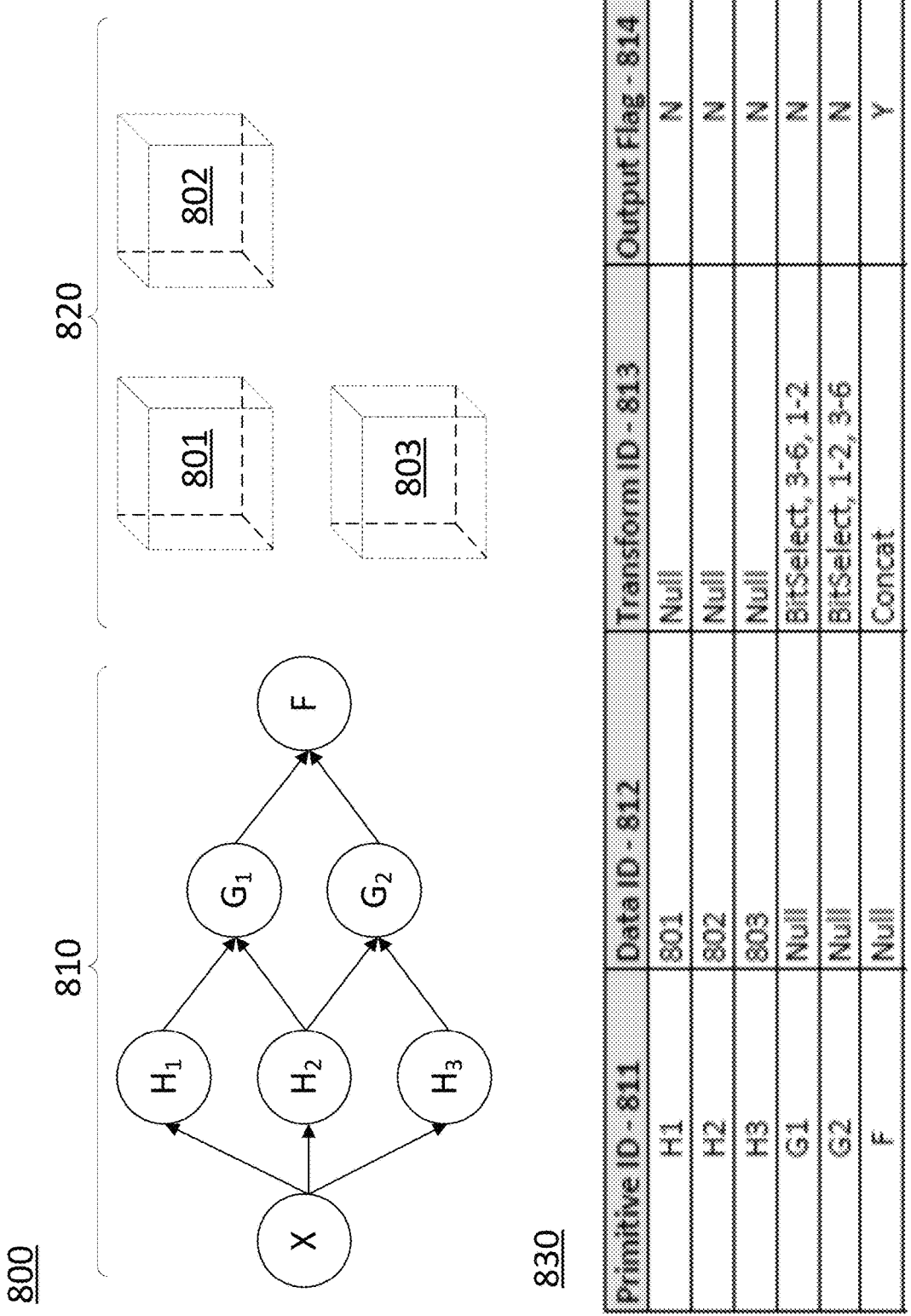
FIG. 8 illustrates a conceptual diagram of, and a corresponding set of primitives in, a complete data representation of a set of white box encryption instructions in accordance with the approaches disclosed herein.

FIG. 8 illustrates a conceptual diagram of, and a corresponding set of primitives in, a complete data representation 800 of a set of white box encryption instructions. The complete data representation can include a directed graph 810 which represents which tasks are prerequisites for the completion of another task when implementing the white box encryption instructions. As illustrated in directed graph 810, H1 and H2 need to be completed before G1 is computed. Likewise, H1, H2, and H3 all depend on X. The directed graph can be sent as a separate data structure or it can be built into the primitives themselves via the inclusion of fields that identify other primitives as prerequisites. The complete data representation can also include a set of data structures 820 such as lookup tables 801, 802, and 803. The data structures can have the characteristics of lookup tables 711 in FIG. 7 in that they can be accessed in a specific sequence to execute the encryption of an associated key. The specific sequence can be specified by the directed graph.

The specific approach used to decompose the process graph of a white box encryption set will affect the characteristics of any primitives that are generated for the complete data representation. An example set of primitives is presented in table 830. The primitives in table 830 are selected from a library comprising lookup table primitives, bit selection primitives, and concatenation primitives. Lookup table primitives can be used by a specialized module to obtain a value from a lookup table based on an input value. Bit selection primitives can be used by a specialized module to select a specific bit from an input value. Concatenation primitives can be used by a specialized module to concatenate input values. The primitives of table 830 include four fields: primitive ID 811, data ID 812, transform ID 813, and output flag 814.

Primitive ID 811 can be a unique identifier, such as a 32-bit random integer that is used to identify the primitive for purposes of sequencing it relative to the other primitives. As mentioned previously, the primitives can have numerous additional fields such as fields identifying which other primitives are prerequisites for their execution and they can be referred to using similar ID fields. The set of primitives in table 830 do not include references to other primitives and are designed to be transferred along with a directed graph. For example, directed graph 810 would indicate that H1 and H2 were prerequisites for G1 and the module responsible for parsing the complete data representation would be able to sequence these primitives for that purpose using the ID fields.

Data ID field 812 references the data associated with the primitive. In the case of H1, H2, and H3, the primitives are lookup table primitives and the associated data IDs reference data structures 801, 802, and 803 respectively for the module to access the appropriate lookup table when parsing the complete data representation. Although not illustrated, if a primitive is a composition of other primitives, data ID 812 could also be a unique identifier of those other primitives and an order in which the primitives are to be composed.

Transform ID field 813 references the kind of transform associated with the primitive. In the illustrated case, G1 and G2 are bit selection primitives, F is a concatenate primitive, and H1, H2, and H3 are lookup table primitives. In this situation, the value NULL is a default value which the module parsing the data representation will interpret as indicating the primitive is a lookup table primitive. The transform ID can also include additional data to further specify the transform. For example, the transform ID field 813 of primitive G1 states that the primitive is a bit selection primitive, and also specifies which bits should be selected from the two input values. As another example, the transform ID field 813 of primitive F states that the primitive is a concatenate primitive, but does not include additional information. In this approach, the default transform could be conducted and the two inputs to the primitive could be concatenated in their entirety in a predetermined order based on information from the directed graph.

Output flag field 814 references whether the output of the primitive is an output of the directed graph. Therefore, when the module responsible for parsing the complete data representation parses instruction F it will know that the result is at least part of the data that should be returned. This information could alternatively be absorbed into the directed graph and does not have to be a field in the primitive itself.

The complete data representation is not directly executed on the processor of the untrusted device. Instead, a module on the untrusted device is used to interpret the data representation and execute the white box encryption to encrypt sensitive data present on the untrusted device. The untrusted device could use the white box encryption module with a block cipher mode of operation, like CBC, ECB, GCM or others, and in additional could use the white box encryption module to encrypt payment related data per an industry standard, such as in a ISO 9564-2 PIN block. The module could be a virtual machine instantiated on the untrusted device capable of parsing the representation, interpreting the primitives and data structures of the data representation into a sequence, and compiling the sequence into a set of instructions that can be executed using the operating system or kernel of the untrusted device.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be a memory within a personal user device, a workstation, or a network accessible memory. Although examples in the disclosure were generally directed to encrypting payment information on an untrusted device in a POS system, the approaches could be directed to any computer or computerized system in which data is encrypted on untrusted or unsecure devices. These and other modifications and variations to the present invention may be practiced by those skilled in the art, without departing from the scope of the present invention, which is more particularly set forth in the appended claims.

What is claimed is:

1. A method comprising:
   storing, in a secure memory on a first device, a key;
   receiving, via a user interface on a second device, sensitive data;
   generating, using a white box encryption generator on the first device, a set of white box encryption instructions based on the key;
   generating, using a secure processor on the first device, a complete data representation of the set of white box encryption instructions;
   transmitting the complete data representation from the first device to the second device; and
   encrypting, using a standard processor on the second device, the sensitive data using the complete data representation;

wherein the complete data representation is not executable.

2. The method of claim 1, wherein:
the first device is a secure payment device housing the secure memory and the secure processor;
the second device is a touch display device; and
after the encrypting of the sensitive data, the sensitive data is an encrypted personal identification number.

3. The method of claim 2, further comprising:
forming a secure wireless connection between the first device and the touch display device;
wherein the transmitting of the complete data representation from the first device to the touch display device is conducted using the secure wireless connection; and
wherein the first device is a secure card reader.

4. The method of claim 3, further comprising:
deriving, using the secure processor on the secure card reader, the key using a random key generator and random configuration data on the first device;
transmitting, using the secure wireless connection, the encrypted personal identification number from the touch display device to the secure card reader;
re-encrypting, using the secure processor on the secure card reader the personal identification number using a secret key; and
transmitting the re-encrypted personal identification number to a payment processor;
wherein the user interface is a touch screen.

5. The method of claim 4, further comprising:
receiving, using the secure card reader, a personal account number from a card;
encrypting, using the secure processor on the secure card reader, the personal account number using the secret key; and
transmitting the encrypted personal account number to the payment processor;
wherein the secret key is a derived unique key per transaction (DUKPT) key.

6. The method of claim 1, wherein generating the complete data representation comprises:
generating a set of lookup tables using the key;
obfuscating, using an obfuscation module on the first device, the set of lookup tables with bijective mixing encodings to produce a set of obfuscated lookup tables; and
generating a directed graph and a set of primitive functions, wherein the set of primitive functions include data which fully describes the set of obfuscated lookup tables.

7. The method of claim 6, further comprising:
instantiating, using the standard processor on the second device, a virtual machine;
parsing, using the standard processor on the second device, the directed graph and the set of primitive functions from the complete data representation;
applying, using the standard processor on the second device, the sensitive data to the set of primitive functions in accordance with the directed graph;
updating the obfuscation module on the first device to an updated obfuscation module;
generating, using the secure processor and the updated obfuscation module on the first device, a second complete data representation of a second set of white box encryption instructions;
re-instantiating, using the standard processor on the second device, the virtual machine; and encrypting, using the virtual machine, a second set of sensitive data using the second complete data representation.

8. The method of claim 1, further comprising:
generating, on the first device, the key;
receiving, via the user interface on the second device, additional sets of sensitive data; and
generating, on the first device, a set of new keys which uniquely correspond with the additional sets of sensitive data.

9. The method of claim 1, further comprising:
parsing, using the standard processor on the second device, a directed graph and a set of primitive functions from the complete data representation; and
applying, using the standard processor on the second device, the sensitive data to the set of primitive functions in accordance with the directed graph.

10. The method of claim 9, wherein a primitive function in the set of primitive functions includes:
a unique identifier;
an array of binary data representing a lookup table; and
a flag to indicate if the primitive function generates a final result in the directed graph.

11. The method of claim 9, further comprising:
instantiating, using the standard processor on the second device, a virtual machine;
wherein the parsing and applying are conducted by the virtual machine; and
wherein the complete data representation is not Turing complete with respect to the standard processor.

12. A system comprising:
a secure device with a secure processor and a secure memory;
an unsecure device with a standard processor;
a secure communication channel between the secure device and the unsecure device;
a key stored in the secure memory;
a white box encryption instruction generator: (i) instantiated by the secure processor; and (ii) programmed to generate a set of white box encryption instructions using the key;
a data representation generator: (i) instantiated by the secure processor; and (ii) programmed to generate a complete data representation of the set of white box encryption instructions using the set of white box encryption instructions; and
a virtual machine: (i) instantiated by the standard processor; and (ii) programmed to encrypt sensitive data using the complete data representation.

13. The system of claim 12, further comprising:
a touch screen on the unsecure device;
wherein the secure communication channel is a wireless communication channel;
wherein the secure device is a secure card reader device;
wherein the unsecure device is a touch display device; and
wherein the sensitive data is a personal identification number received via the touch screen.

14. The system of claim 12, further comprising:
a secret key stored in the secure memory;
a secure server programmed to decrypt the sensitive data using the secret key;
wherein the secure device is programmed to: (i) decrypt the encrypted sensitive data from the unsecure device using the key; and (ii) re-encrypt the sensitive data using the secret key; and
wherein the secret key is a derived unique key per transaction (DUKPT) key.

15. The system of claim 12, further comprising:
a touch screen on the unsecure device that is programmed to receive the sensitive data;
a card reader on the secure device that is programmed to receive a personal account number from a card;
a secure server;
wherein the sensitive data is a personal identification number; and
wherein the personal account number and the personal identification number are used by the secure server to authorize a payment.

16. The system of claim 15, further comprising:
an operating system instantiated on the unsecure device by the processor;
wherein the complete data representation is not executable by the operating system; and
wherein the complete data representation is not Turing complete.

17. The system of claim 15, wherein the data representation generator is programmed to
generate the complete data representation by:
generating a set of lookup tables using the key;
obfuscating, using an obfuscation module on the secure device, the set of lookup tables with bijective mixing encodings to produce a set of obfuscated lookup tables; and
generating a directed graph and a set of primitive functions, wherein the set of primitive functions include data which fully describes the set of obfuscated lookup tables.

18. The system of claim 15, wherein the virtual machine is programmed to encrypt the sensitive data by:
parsing, using the standard processor on the unsecure device, a directed graph and a set of primitive functions from the complete data representation; and
applying, using the standard processor on the unsecure device, the sensitive data to the set of primitive functions in accordance with the directed graph.

19. A system comprising:
an untrusted device with a user interface to receive sensitive data;
a processor on the untrusted device;
an operating system instantiated on the untrusted device by the processor;
a secure card reader device;
a wireless communication channel between the untrusted device and the secure card reader device;
a key stored in the secure card reader device;
a memory on the secure card reader device storing instructions to:
generate a set of white box encryption instructions using the key; and
generate a complete data representation of the white box encryption instructions; and
an application: (i) instantiated on the untrusted device; and (ii) programmed to encrypt the sensitive data using the complete data representation;
wherein the complete data representation does not include executable code for the operating system.

20. The system of claim 19, wherein:
the user interface is a touch screen;
the untrusted device is a touch display device; and
the sensitive data is a personal identification number received via the touch screen.

21. The system of claim 19, further comprising:
a secret key stored in the secure memory;
a secure server programmed to decrypt the sensitive data using the secret key;
wherein the secure device is programmed to: (i) decrypt the encrypted sensitive data from the untrusted device using the key; and (ii) re-encrypt the sensitive data using the secret key; and
wherein the secret key is a derived unique key per transaction (DUKPT) key.

22. The system of claim 19, wherein the secure card reader device is programmed to
generate the complete data representation by:
generating a set of lookup tables using the key;
obfuscating, using an obfuscation module on the secure card reader device, the set of lookup tables with bijective mixing encodings to produce a set of obfuscated lookup tables; and
generating a directed graph and a set of primitive functions, wherein the set of primitive functions include data which fully describes the set of obfuscated lookup tables.

23. The system of claim 19, wherein the untrusted device is programmed to encrypt the sensitive data by:
parsing, using the processor on the untrusted device, a directed graph and a set of primitive functions from the complete data representation; and
applying, using the processor on the untrusted device, the sensitive data to the set of primitive functions in accordance with the directed graph.

* * * * *